Patented Nov. 24, 1931

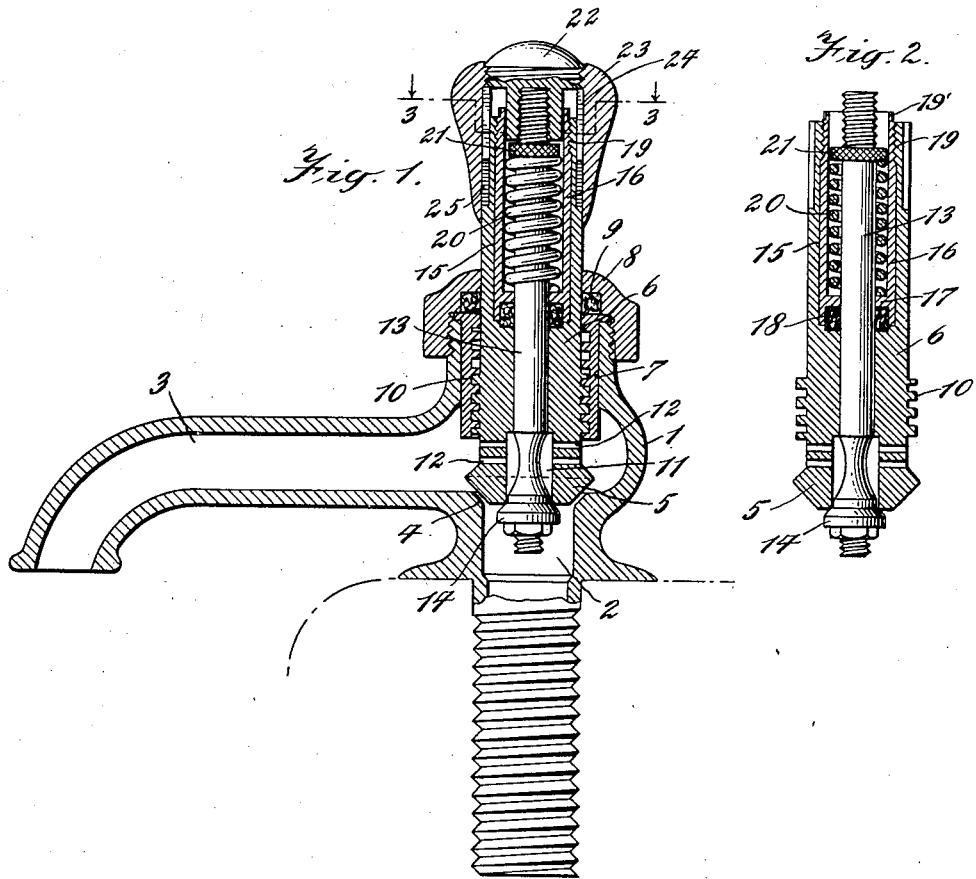
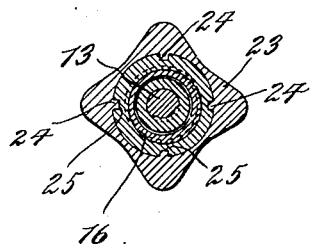

1,833,653

UNITED STATES PATENT OFFICE

WILLETT MARTIN, OF ELIZABETH, NEW JERSEY

VALVE

Application filed May 29, 1930. Serial No. 456,889.

This invention relates to a novel and improved form of valve, the novel features of which will be best understood from the following description and the annexed drawings, in which I have shown a selected embodiment of the invention, and in which:—

Fig. 1 is a vertical sectional view through a device constructed according to this invention;

Fig. 2 is a view similar to Fig. 1, but showing a portion of the device detached;

Fig. 3 is a section on the line 3—3 of Fig. 1.

My invention may be used in any valve construction, and, therefore, while I have shown it in connection with a valve for use with a spigot, it is to be understood that this is only exemplary.

In the illustrated embodiment, the invention is shown in connection with a valve body 1, having an inlet 2 through which water or other fluid may flow, and from which it may pass through an outlet 3. Between the inlet and outlet, according to this invention, is a valve seat 4 coacting with a valve 5 to control the flow between inlet and outlet. The valve has an elongated neck 6 extending through an opening in the body and threaded into a bushing 7 fast to the body. Between the top of the bushing 7 and the packing nut 8, and between the nut and the bushing, is disposed packing 9 surrounding the neck 6 of the valve.

The neck is preferably threaded into the bushing 7 as indicated at 10 whereby, upon turning of the neck, the valve 5 will be operated towards or away from the seat 4 to control flow between the inlet and the outlet. According to this invention, flow may also be caused by a simple pushing movement of the hand, as well as by a turning movement, and this is accomplished by forming a second path for the fluid from inlet to outlet. In this form, this path is provided by means of a bore 11 in the valve connected to passages 12 extending transversely from the bore.

Slidably mounted in a hole in the neck 6 is a stem 13 connected to a valve 14 adapted to close the bore 11, the bottom of this bore forming a seat coacting with the valve 14. The stem 13 is slidably mounted in the hole in the neck so that longitudinal movement of this stem will open or close the valve 14 to regulate flow from inlet to outlet through the second path thus provided.

The neck is preferably provided with a centrally disposed bore 15 within which is disposed a sleeve 16 having a bottom 17 through which the stem 13 passes. Between the bottom 17 and the bottom of the bore is disposed packing 18 surrounding the stem, and preferably the sleeve 16 is threaded in the bore, as indicated at 19, so that by tightening the sleeve, the packing may be also tightened. The sleeve may be turned by any suitable tool, or by a knurled end 19'.

Surrounding the stem within the sleeve is a spring 20 which contacts with the bottom 17 of the sleeve, and with a nut 21 threaded on the upper part of the stem. For the sake of simplicity, this nut will in the claims be referred to as a stationary part, although, of course, it can be adjusted to vary the compression exerted by the spring 20. Threaded on the upper end of the stem is an operating member which may be termed a handle 22, and this handle is provided with portions 23 overlying the outside of the neck and provided with keys 24 (Fig. 3) engaging in grooves 25 in the neck.

By the above arrangement, it will be seen that flow between inlet and outlet may be controlled by turning the handle 22 which, by the key and groove connection, will cause rotation of the neck of the valve 5 and, consequently, of this valve itself. On the other hand, if it is desired to permit flow between inlet and outlet for only a short period of time, the valve 14 may be operated by simply pressing down on the handle 22, which will, of course, compress the spring 20 and permit opening of the valve. Upon release of pressure on the handle 22, the spring will return the valve 14 to the position shown in the drawings.

From the above, it will be seen that I have provided a novel form of valve having two paths through which flow may take place from inlet to outlet, and temporary flow through one path is governed by a simple pushing movement on the handle, while continued flow through the other path may be obtained by a turning movement of the same handle. At the same time, a novel construction is obtained by the arrangement of the sleeve in the neck of the valve. The compression exerted by the spring will tend to compress the packing 18 in case the threaded connection 19 is omitted, while, when this threaded connection is used, a means is thus provided for not only compressing the spring, but also for compressing the packing to any desired amount.

I claim:

1. In combination, a valve body having an inlet and an outlet with two paths through either of which a fluid may pass from the inlet to the outlet, a stem slidably and rotatably mounted in said body, a valve operated by sliding of the stem to control flow through one of said paths, a handle secured to said stem, and a valve keyed to said handle and operated by rotation of the handle to control flow through the other path.

2. In combination, a valve body having an inlet and an outlet with a valve seat therebetween, a valve cooperating with said seat and having an elongated neck extending through an opening in the body, means forming a threaded connection between said neck and body, means forming a passage through said valve between said inlet and outlet, a stem slidably mounted in said neck and having a second valve controlling flow through said passage, a handle secured to said stem, and a keyed connection between said handle and neck, whereby sliding of the stem and handle may take place to operate said second valve and whereby rotation of the handle will rotate the neck to operate the first valve.

3. In combination, a valve body having an inlet and an outlet with a valve seat therebetween, a valve cooperating with said seat and having an elongated neck extending through an opening in the body, means forming a threaded connection between said neck and body, means forming a passage through said valve between said inlet and outlet, a stem slidably mounted in said neck and having a second valve controlling flow through said passage, a handle secured to said stem, a keyed connection between said handle and neck, whereby sliding of the stem and handle may take place to operate said second valve and whereby rotation of the handle will rotate the neck to operate the first valve, and a spring normally forcing the stem in one direction to close the second valve.

4. In combination, a valve body having an inlet and an outlet with a valve seat therebetween, a valve cooperating with said seat and having an elongated neck extending through an opening in the body, means forming a threaded connection between said neck and body, means forming a passage through said valve between said inlet and outlet, a stem slidably mounted in said neck and having a second valve controlling flow through said passage, a handle secured to said stem and having a portion overlying the outer face of the neck and keyed thereto, whereby sliding of the stem and handle may take place to operate said second valve and whereby rotation of the handle will rotate the neck to operate the first valve.

5. In combination, a valve body having an inlet and an outlet, a valve seat between said inlet and outlet, a valve adapted to contact with said seat and having a passage therethrough connecting said inlet and outlet, a stem slidably mounted in said valve and having a second valve thereon adapted to control flow through said passage, means normally holding said second valve in position to close said passage, means forming threaded engagement between said first valve and said body, and a handle secured to said stem and movable therewith lengthwise of said first valve but keyed thereto whereby the handle may move said stem longitudinally to operate said second valve, and upon rotation will operate said first valve.

6. In combination, a valve body having an inlet and an outlet with a valve seat therebetween, a valve cooperating with said seat and having an elongated neck extending through an opening in the body, means forming a threaded connection between said neck and body, means forming a passage through said valve between said inlet and outlet, a stem slidably mounted in said neck and having a second valve controlling flow through said passage, a sleeve threaded in a bore in said neck and having a bottom with a hole through which said stem passes, packing between the bottom of the sleeve and the bottom of the bore whereby upon turning of the sleeve the packing may be tightened, a spring surrounding said stem and engaging the bottom of said sleeve, a stationary part on the stem to normally hold the second valve in engagement with its seat, and means to operate said stem lengthwise thereof to open said second valve or to rotate said neck to operate said first valve.

7. In combination, a member having a passage therethrough, a valve controlling flow through said passage and having a stem slidably mounted in a hole in the member, a sleeve surrounding said stem and disposed in a bore concentric with said hole and having a bottom with a hole through which said stem passes, a spring surrounding said stem and disposed between said bottom and a stationary part on the stem, and packing surrounding the stem between the bottom of the sleeve and the bottom of the bore.

8. In combination, a member having a passage therethrough, a valve controlling flow through said passage and having a stem slidably mounted in a hole in the member, a sleeve surrounding said stem and disposed in a bore concentric with said hole and having a bottom with a hole through which said stem passes, a spring surrounding said stem and disposed between said bottom and a stationary part on the stem, packing surrounding the stem between the bottom of the sleeve and the bottom of the bore, and means forming threaded engagement between the sleeve and the member.

WILLETT MARTIN.